United States Patent
Zhang et al.

(10) Patent No.: US 11,858,838 B2
(45) Date of Patent: Jan. 2, 2024

(54) SEWAGE UNIFORM DISTRIBUTION TREATMENT DEVICE FOR AEROBIC GRANULAR SLUDGE SYSTEM AND USE METHOD THEREFOR

(71) Applicant: BEIJING DRAINAGE GROUP CO., LTD, Beijing (CN)

(72) Inventors: Shujun Zhang, Beijing (CN); Shuai Zhang, Beijing (CN); Jiawei Wang, Beijing (CN); Yong Jiang, Beijing (CN); Yongqing Gao, Beijing (CN); Bingyu Zheng, Beijing (CN); Fangbo Bao, Beijing (CN)

(73) Assignee: BEIJING DRAINAGE GROUP CO., LTD, Beijing (CN)

( * ) Notice: Subject to any disclaimer, the term of this patent is extended or adjusted under 35 U.S.C. 154(b) by 728 days.

(21) Appl. No.: 16/967,311

(22) PCT Filed: Sep. 23, 2019

(86) PCT No.: PCT/CN2019/107336
§ 371 (c)(1),
(2) Date: Aug. 4, 2020

(87) PCT Pub. No.: WO2020/093801
PCT Pub. Date: May 14, 2020

(65) Prior Publication Data
US 2021/0355008 A1    Nov. 18, 2021

(30) Foreign Application Priority Data
Nov. 6, 2018 (CN) .......................... 201811311612.7

(51) Int. Cl.
*C02F 3/04* (2023.01)
*C02F 3/12* (2023.01)
*C02F 3/00* (2023.01)

(52) U.S. Cl.
CPC ............ *C02F 3/043* (2013.01); *C02F 3/1236* (2013.01); *C02F 2003/001* (2013.01); *C02F 2203/006* (2013.01)

(58) Field of Classification Search
CPC .. C02F 3/043; C02F 3/1236; C02F 2003/001; C02F 2203/006; C02F 3/1205;
(Continued)

(56) References Cited

U.S. PATENT DOCUMENTS 6,863,818 B2 *   3/2005   Daigger .................. C02F 3/006
                                                           210/220

FOREIGN PATENT DOCUMENTS

CA          3052371 A1 *   8/2018  .......... B01D 63/043
CN         203836618 U  *   9/2014
(Continued)

Primary Examiner — Joseph W Drodge
(74) Attorney, Agent, or Firm — BROWDY AND NEIMARK, P.L.L.C.

(57) ABSTRACT

A sewage uniform distribution treatment device for an aerobic granular sludge system and a use method therefor, the device comprising a reactor tank body (1), a water inlet device (2), and a water outlet device (3). The water inlet device (2) comprises a water inlet inner channel (4), a water inlet weir (5), a water inlet outer channel (6), a vertical water inlet branch pipe (7), and vertical bell mouths (8); the water outlet device (3) comprises a water outlet main pipe (9), a water outlet channel (10), a water outlet weir (11), an outer baffle plate (12), and an inner baffle plate (13); the water outlet channel is connected to the water outlet main pipe; the outer baffle plate is a vertical baffle plate; the inner baffle plate is located at the bottom of the water outlet channel and is connected to the water outlet channel.

8 Claims, 2 Drawing Sheets

(58) Field of Classification Search
CPC .... C02F 1/006; C02F 3/12; C02F 3/30; C02F 9/00; C02F 3/1278; C02F 3/1284; C02F 3/16; C02F 3/20; Y02W 10/10; B01D 11/02; B01D 21/0087; B01D 21/24; B01D 21/2405; B01D 21/2416; B01D 21/2427; B01D 21/2444
USPC .......................................................... 210/616
See application file for complete search history.

(56) References Cited

FOREIGN PATENT DOCUMENTS

| CN | 206143030 U | * | 5/2017 | |
|---|---|---|---|---|
| CN | 206521294 U | * | 9/2017 | |
| CN | 207210201 U | * | 4/2018 | |
| EP | 2767516 A1 | * | 8/2014 | ............ C02F 3/1294 |

* cited by examiner

SEWAGE UNIFORM DISTRIBUTION TREATMENT DEVICE FOR AEROBIC GRANULAR SLUDGE SYSTEM AND USE METHOD THEREFOR

BACKGROUND OF THE INVENTION

Field of the Invention

The disclosure relates to the technical field of sewage treatment, in particular to a sewage uniform treatment device and a method of using the same.

Description of Related Art

Water pollution problems in China are serious. Traditional water distribution methods have disadvantages of high cost, high energy consumption, and poor contact between organic matters and sludge. In ordinary activated sludge projects, the forward and backward pushing flow method is mostly used for water distribution. Fresh sewage enters a biological pool and is mixed with raw water, which reduces the organic load of fresh sewage and is disadvantageous to anaerobic phosphorus release and denitrification of sludge. Therefore, it is of great practical significance to develop a new technology and a new process with low operating cost, low energy consumption, and full contact of organic matters in sewage with sludge to overcome limitations of traditional processes.

BRIEF SUMMARY OF THE INVENTION

The objective of the disclosure is to provide a sewage uniform distribution treatment device for an aerobic granular sludge system and a method of using the same to overcome the above disadvantages of water distribution in the prior art, which have the advantages of being reasonable in structural design, convenient to operate and use, low in running energy consumption, low in later maintenance cost, and high in automation and intelligence degree, and can achieve the effect of an ideal contact between organic matters and sludge.

To achieve the above objective, the present disclosure is implemented using the following technical solutions:

A sewage uniform distribution treatment device for an aerobic granular sludge system, the sewage uniform distribution treatment device comprises a reactor tank body, a water inlet device and a water outlet device, wherein, the water inlet device and the water outlet device are both arranged in the reactor tank body, and the elevation of the water inlet device is higher than the elevation of the water outlet device; and the water inlet device comprises a water inlet inner channel, a water inlet weir, a water inlet outer channel, a vertical water inlet branch pipe and vertical bell mouths, the water inlet weir is located at the top of the water inlet inner channel and is connected with the water inlet inner channel, the vertical water inlet branch pipe is vertically arranged in the reactor tank body, and the upper and lower ends of the vertical water inlet branch pipe are respectively connected with the water inlet outer channel and the vertical bell mouths; the water inlet device is communicated with the bottom of the reactor tank body through the vertical bell mouths; the water outlet device comprises a water outlet main pipe, a water outlet channel, a water outlet weir, an outer baffle plate and an inner baffle plate; the water outlet channel is connected with the water outlet main pipe, the water outlet weir is located at the top of the water outlet channel and is connected with the water outlet channel; the outer baffle plate is a vertical baffle plate, and the vertical baffle plate is connected with the reactor tank body; the inner baffle plate is located at the bottom of the water outlet channel and is connected with the water outlet channel; the inner baffle plate is provided at a certain included angle with the water outlet channel, and the value of the included angle is 30-60 degrees; the water outlet device is communicated with the reactor tank body through the water outlet channel.

As a further optimization of the above solution, the water inlet inner channel is designed according to partially-filled flow, with a roughness coefficient of 0.0013, a degree of fullness ranging from 0.5-0.8, preferably 0.6, and a slope ranging from 0.002-0.005, preferably 0.003.

As a further optimization of the above solution, the water inlet weir is a right triangular weir, the water inlet weir is located at the top of the water inlet inner channel and is connected with the water inlet inner channel, and a load to check a single water inlet weir is 2.5 L/(m·s), and theoretical calculation formulas are:

flow of a single triangular weir $$q_0 = \frac{\text{total flow } Q}{\text{number of triangular weirs } n};$$

loss of water head on weir of a single triangular weir $$h_0 = \frac{\sqrt[2.5]{\text{flow of a single triangular weir } q_0}}{1.4};$$

load to check a single water inlet weir $$q_1 = \frac{0.5 * \text{total flow } Q}{\text{number of triangular weirs } n * \text{loss of water head on weir of a single triangular weir } h_0}.$$

As a further optimization of the above solution, the bottom of the water inlet outer channel is connected with the vertical water inlet branch pipe, the water inlet inner channel, the water inlet outer channel and the vertical water inlet branch pipe are located on the same axis of symmetry, and the bottom part of the vertical water inlet branch pipe is divided into pipes along four directions which form angles of 27°, 153°, 207° and 333° with the horizontal direction, and the vertical bell mouths are distributed at said angles and can be uniformly distributed at the bottom of the reactor tank body. As a further optimization of the above solution, the opening angle of the vertical bell mouth is 60°-120°, preferably 90°, the vertical bell mouths are arranged in a ring at equal intervals in the reactor tank body relative to the central axis of the vertical water inlet branch pipe.

As a further optimization of the above solution, the height of the water outlet channel is 100-300 mm lower than the height of the water inlet inner channel and has no slope, the bottom of the water outlet channel is connected with the inner baffle plate, and the angle between the inner baffle plate and the horizontal direction is 30°-60°, preferably 45°.

As a further optimization of the above solution, the water outlet weir is a right triangular weir, the water outlet weir is located at the top of the water outlet channel and is connected with the water outlet channel, a load to check a single water outlet weir is 1.47 L/(m·s), and theoretical calculation formulas are:

flow of a single triangular weir $$q_0 = \frac{\text{total flow } Q}{\text{number of triangular weirs } n};$$

loss of water head on weir of a single triangular weir $$h_0 = \frac{\sqrt[2.5^2]{\text{flow of a single triangular weir } q_0}}{1.4};$$

load to check a single water inlet weir $$q_1 = \frac{0.5 * \text{total flow } Q}{\text{number of triangular weirs } n * \text{loss of water head on weir of a single triangular weir } h_0}.$$

A method of use of the sewage uniform distribution treatment device for an aerobic granular sludge system according to the present disclosure comprises the following steps:

1) uniformly distributing the sewage selectively by the water inlet device: the sewage collected by the water inlet inner channel fells into the water inlet outer channel through the water inlet weir, and primary separation and distribution of the sewage are achieved;

2) the sewage in the water inlet outer channel flows to the vertical water inlet pipe automatically, and finally flows into the reactor tank body through the vertical bell mouths which are uniformly distributed at the bottom of the reactor tank body, so that secondary separation and distribution of sewage are realized;

3) because of the elevation difference between the water inlet device and the water outlet device, the sewage in the reactor tank body enters the water outlet channel through the water outlet weir, and the sewage in the water outlet channel flows out of the reactor tank body through the water outlet pipe, so that continuous and stable operation of the water distribution system is guaranteed.

The sewage uniform distribution treatment device for an aerobic granular sludge system and a method of using the same according to the present disclosure have the following beneficial effects:

(1) The sewage uniform distribution treatment device of the present disclosure selectively distributes water using a water inlet device, effectively reduces unusable space in a reactor, and enhances the uniformity of sewage inflow;

(2) The sewage uniform distribution treatment device of the present disclosure utilizes the collection function of a water outlet device to make the sewage outflow cover a wide range and to realize the effect of the inlet water withstanding the outlet water in the reactor;

(3) The sewage uniform distribution treatment device of the present disclosure can realize a uniform layout of sewage, a simple structure, a good uniformity, and a broad application prospect.

The meanings of the reference signs in the above figures are as follows:

1 A reactor tank body; 2 water inlet device; 3 water outlet device; 4 water inlet inner channel; 5 water inlet weir; 6 water inlet outer channel; 7 vertical water inlet branch pipe, 8 vertical bell mouth, 9 water outlet main pipe, 10 water outlet channel, 11 water outlet weir, 12 outer baffle plate, 13 inner baffle plate, 14 pipes along four directions.

DETAILED DESCRIPTION OF THE INVENTION

Figure 1:
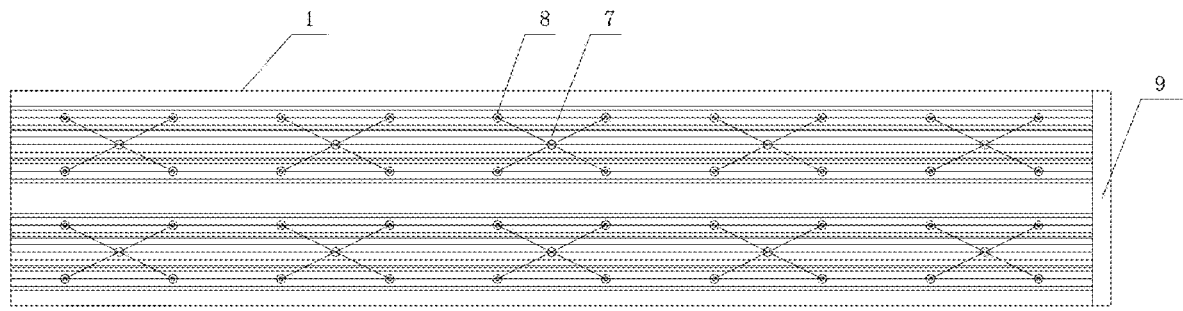
FIG. 1 is a side view structure diagram of the sewage uniform treatment device of the present disclosure.
Figure 2:
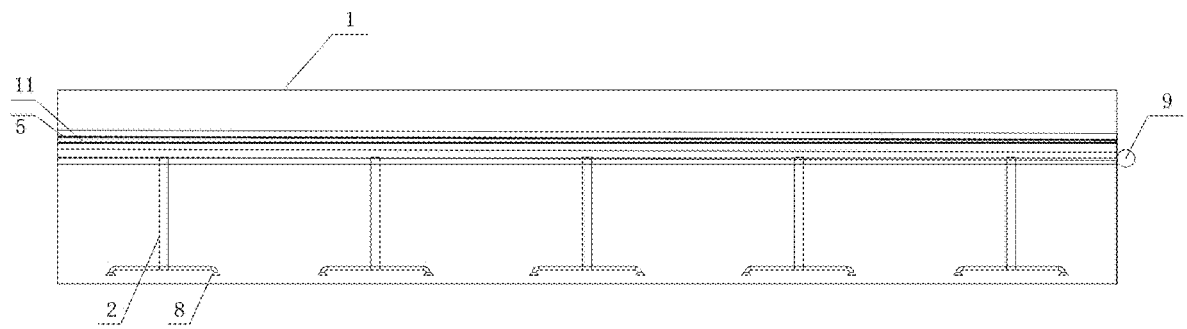
FIG. 2 is a front view structure diagram of the sewage uniform treatment device of the present disclosure.
Figure 3:
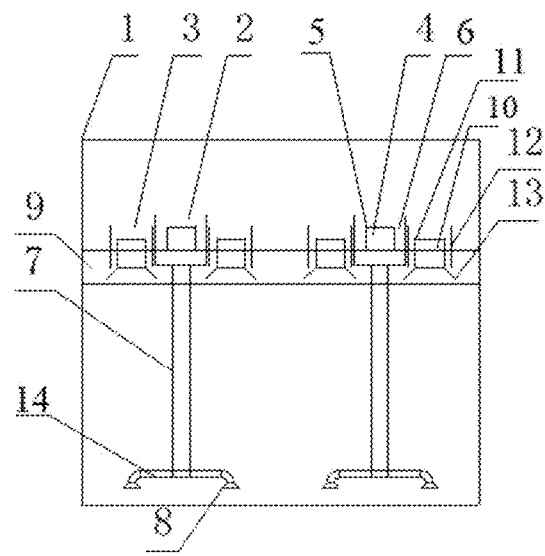
FIG. 3 is a right view structure diagram of the sewage uniform treatment device of the present disclosure.
Figure 4:
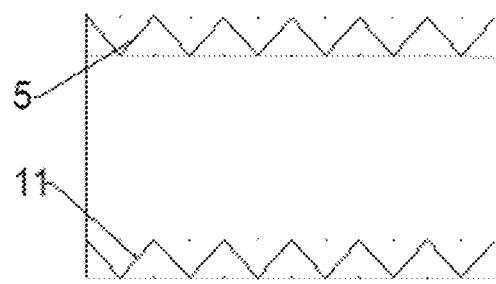
FIG. 4 is a front view structure diagram of the water inlet weir and water outlet weir of the present disclosure.

The sewage uniform treatment device and the method of using the same of the present disclosure will be described in detail below with reference to FIGS. 1-4.

A sewage uniform distribution treatment device for an aerobic granular sludge system, the sewage uniform distribution treatment device comprises a reactor tank body 1, a water inlet device 2 and a water outlet device 3, wherein, the water inlet device and the water outlet device are both arranged in the reactor tank body 1, and the elevation of the water inlet device 2 is higher than the elevation of the water outlet device; and the water inlet device comprises a water inlet inner channel 4, a water inlet weir 5, a water inlet outer channel 6, a vertical water inlet branch pipe 7 and vertical bell mouths 8, the water inlet weir 5 is located at the top of the water inlet inner channel 4 and is connected with the water inlet inner channel 4, the vertical water inlet branch pipe 7 is vertically arranged in the reactor tank body, and the upper and lower ends of the vertical water inlet branch pipe are respectively connected with the water inlet outer channel 6 and the vertical bell mouths 8; the water inlet device is communicated with the bottom of the reactor tank body through the vertical bell mouths; the water outlet device 3 comprises a water outlet main pipe 9, a water outlet channel 10, a water outlet weir 11, an outer baffle plate 12 and an inner baffle plate 13; the water outlet channel 10 is connected with the water outlet main pipe 9, the water outlet weir 11 is located at the top of the water outlet channel 10 and is connected with the water outlet channel 10; the outer baffle plate 12 is a vertical baffle plate, and the vertical baffle plate is connected with the reactor tank body 1; the inner baffle plate 13 is located at the bottom of the water outlet channel 10 and is connected with the water outlet channel 10; the inner baffle plate 13 is provided at a certain included angle with the water outlet channel, and the value of the included angle is 30-60 degrees; the water outlet device 3 is communicated with the reactor tank body 1 through the water outlet channel 10. The water inlet inner channel 4 is designed according to partially-filled flow, with a roughness coefficient of 0.0013, a degree of fullness ranging from 0.5-0.8, preferably 0.6, and a slope ranging from 0.002-0.005, preferably 0.003.

The water inlet weir is a right triangular weir, the water inlet weir 5 is located at the top of the water inlet inner channel 4 and is connected with the water inlet inner channel 4, and a load to check a single water inlet weir 5 is 2.5 L/(m·s), and theoretical calculation formulas are:

flow of a single triangular weir $$q_0 = \frac{\text{total flow } Q}{\text{number of triangular weirs } n};$$

loss of water head on weir of a single triangular weir $$h_0 = \frac{\sqrt[2.5^2]{\text{flow of a single triangular weir } q_0}}{1.4};$$

load to check a single water inlet weir $$q_1 = \frac{0.5 * \text{total flow } Q}{\text{number of triangular weirs } n * \text{loss of water head on weir of a single triangular weir } h_0}.$$

The bottom of the water inlet outer channel 6 is connected with the vertical water inlet branch pipe 7, the water inlet inner channel 4, the water inlet outer channel 6 and the vertical water inlet branch pipe 7 are located on the same axis of symmetry, and the bottom part of the vertical water inlet branch pipe 7 is divided into pipes 14 along four directions which form angles of 27°, 153°, 207° and 333° with the horizontal direction, and the vertical bell mouths 8 are distributed at said angles and can be uniformly distributed at the bottom of the reactor tank body 1.

The opening angle of the vertical bell mouth 8 is 60°-120°, preferably 90°, the vertical bell mouths 8 are arranged in a ring at equal intervals in the reactor tank body 1 relative to the central axis of the vertical water inlet branch pipe 7.

The height of the water outlet channel 10 is 100-300 mm lower than the height of the water inlet inner channel 4 and has no slope, the bottom of the water outlet channel 10 is connected with the inner baffle plate 13, and the angle between the inner baffle plate 13 and the horizontal direction is 30°-60°, preferably 45°.

The water outlet weir is a right triangular weir 11, the water outlet weir 11 is located at the top of the water outlet channel 10 and is connected with the water outlet channel 10, a load to check a single water outlet weir 11 is 1.47 L/(m·s), and theoretical calculation formulas are:
flow of a single triangular weir $$q_0 = \frac{\text{total flow } Q}{\text{number of triangular weirs } n};$$

loss of water head on weir of a single triangular weir $$h_0 = \frac{\sqrt[2.5^2]{\text{flow of a single triangular weir } q_0}}{1.4};$$

load to check a single water inlet weir $$q_1 = \frac{0.5 * \text{total flow } Q}{\text{number of triangular weirs } n * \text{loss of water head on weir of a single triangular weir } h_0}.$$

A method of use of the sewage uniform distribution treatment device for an aerobic granular sludge system according to the present disclosure comprises the following steps:

1) uniformly distributing the sewage selectively by the water inlet device: the sewage collected by the water inlet inner channel fells into the water inlet outer channel through the water inlet weir, and primary separation and distribution of the sewage are achieved;

2) the sewage in the water inlet outer channel flows to the vertical water inlet pipe automatically, and finally flows into the reactor tank body through the vertical bell mouths which are uniformly distributed at the bottom of the reactor tank body, so that secondary separation and distribution of sewage are realized;

3) because of the elevation difference between the water inlet device and the water outlet device, the sewage in the reactor tank body enters the water outlet channel through the water outlet weir, and the sewage in the water outlet channel flows out of the reactor tank body through the water outlet pipe, so that continuous and stable operation of the water distribution system is guaranteed.

The beneficial effects of the sewage uniform distribution treatment device for an aerobic granular sludge system of the present disclosure are as follows:

(1) The sewage is selectively diverted by the water inlet device and distributed uniformly in the reactor tank body, the water inlet weir is provided in the water inlet device, so that the sewage will be redistributed after falling through the water inlet weir, and the kinetic energy of the sewage in the water inlet inner channel is lowered.

(2) A relatively stable area is created by the blocking effect of the inner baffle plate and the outer baffle plate, the sewage can settle down freely, which is advantageous to the separation of sewage and sludge and reduction of the concentration of suspended matters in the outlet water.

(3) The water inlet device and water outlet device are utilized to achieve the effect of the inlet water withstanding the outlet water, the sludge and sewage organic matters are in complete contact in a gradient manner, creating a satiety-hungry environment, which is beneficial to denitrification and anaerobic phosphorus release and to achieve granulation of the sludge.

(4) The process is simple, the processing capacity is large, and the efficiency is high, which plays an important role in achieving the granulation of the pilot and demonstration projects of existing granular sludge processes.

The above description of the embodiments is to facilitate those skilled in the art to understand and apply the present disclosure. Those skilled in the art can obviously make various modifications to these embodiments easily, and apply the general principles described here to other embodiments without creative work. Therefore, the present disclosure is not limited to the embodiments herein. Based on the disclosure of the present disclosure, those skilled in the art should make improvements and modifications without departing from the scope of the present disclosure within the protection scope of the present disclosure.

What is claimed is:

1. A sewage uniform distribution treatment device for an aerobic granular sludge system, characterized in that, the sewage uniform distribution treatment device comprises a reactor tank body, a water inlet device and a water outlet device, wherein, the water inlet device and the water outlet device are both arranged in the reactor tank body, and an elevation of the water inlet device is higher than an elevation of the water outlet device; and the water inlet device comprises a water inlet inner channel, a water inlet weir, a water inlet outer channel, a vertical water inlet branch pipe and vertical bell mouths, the water inlet weir is located at a top of the water inlet inner channel and is connected with the water inlet inner channel, the vertical water inlet branch pipe is vertically arranged in the reactor tank body, and upper and lower ends of the vertical water inlet branch pipe are respectively connected with the water inlet outer channel and the vertical bell mouths; a bottom of the water inlet outer channel is connected with the vertical water inlet branch pipe; the water inlet device is communicated with a bottom of the reactor tank body through the vertical bell mouths; the water outlet device comprises a water outlet main pipe, a water outlet channel, a water outlet weir, an outer baffle plate and an inner baffle plate; the water outlet channel is connected with the water outlet main pipe, the water outlet weir is located at a top of the water outlet channel and is connected with the water outlet channel; the outer baffle plate is a vertical baffle plate, and the vertical baffle plate is connected with the reactor tank body; the inner baffle plate is located at a bottom of the water outlet channel and is connected with the water outlet channel; the inner baffle plate is provided at a certain included angle with the water outlet channel, and the value of the included angle is 30-60 degrees; the water outlet device is communicated with the reactor tank body through the water outlet channel.

2. The sewage uniform distribution treatment device for an aerobic granular sludge system according to claim 1, characterized in that, the water inlet inner channel is designed according to partially-filled flow, with a roughness coefficient of 0.0013, a degree of fullness ranging from 0.5-0.8, and a slope ranging from 0.002-0.005.

3. The sewage uniform distribution treatment device for an aerobic granular sludge system according to claim 1, characterized in that, the water inlet weir is a right triangular weir, the water inlet weir is located at the top of the water inlet inner channel and is connected with the water inlet inner channel, and a load to check a single water inlet weir is 2.5 L/(m·s), and theoretical calculation formulas are:

flow of a single triangular weir $$q_0 = \frac{\text{total flow } Q}{\text{number of triangular weirs } n};$$

loss of water head of a single triangular weir $$h_0 = \frac{\sqrt[2.5^2]{\text{flow of a single triangular weir } q_0}}{1.4};$$

load to check a single water inlet weir $$q_1 = \frac{0.5 * \text{total flow } Q}{\text{number of triangular weirs } n * \text{loss of water head on weir of a single triangular weir } h_0}.$$

4. The sewage uniform distribution treatment device for an aerobic granular sludge system according to claim 1, characterized in that, the water inlet inner channel, the water inlet outer channel and the vertical water inlet branch pipe are located on the same axis of symmetry, and a bottom part of the vertical water inlet branch pipe is divided into pipes along four directions which form angles of 27°, 153°, 207° and 333° with the horizontal direction, and the vertical bell mouths are distributed at said angles and are uniformly distributed at the bottom of the reactor tank body.

5. The sewage uniform distribution treatment device for an aerobic granular sludge system according to claim 1, characterized in that, the opening angle of the vertical bell mouth is 60°-120°, and the vertical bell mouths are arranged in a ring at equal intervals in the reactor tank body relative to the central axis of the vertical water inlet branch pipe.

6. The sewage uniform distribution treatment device for an aerobic granular sludge system according to claim 1, characterized in that, the height of the water outlet channel is 100-300 mm lower than the height of the water inlet inner channel and has no slope, the bottom of the water outlet channel is connected with the inner baffle plate, and the angle between the inner baffle plate and the horizontal direction is 30°-60°.

7. The sewage uniform distribution treatment device for an aerobic granular sludge system according to claim 1, characterized in that, the water outlet weir is a right triangular weir, the water outlet weir is located at the top of the water outlet channel and is connected with the water outlet channel, a load to check a single water outlet weir is 1.47 L/(m·s), and theoretical calculation formulas are:

flow of a single triangular weir $$q_0 = \frac{\text{total flow } Q}{\text{number of triangular weirs } n};$$

loss of water head of a single triangular weir $$h_0 = \frac{\sqrt[2.5^2]{\text{flow of a single triangular weir } q_0}}{1.4};$$

load to check a single water inlet weir $$q_1 = \frac{0.5 * \text{total flow } Q}{\text{number of triangular weirs } n * \text{loss of water head on weir of a single triangular weir } h_0}.$$

8. A method of use of the sewage uniform distribution treatment device for an aerobic granular sludge system according to claim 1, characterized in that, the method of use comprises the following step:

uniformly distributing the sewage selectively by the water inlet device.

* * * * *